(12) United States Patent
Varkey

(10) Patent No.: US 7,920,765 B2
(45) Date of Patent: Apr. 5, 2011

(54) RUGGEDIZED OPTICAL FIBERS FOR WELLBORE ELECTRICAL CABLES

(75) Inventor: Joseph Varkey, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 193 days.

(21) Appl. No.: 11/279,336

(22) Filed: Apr. 11, 2006

(65) Prior Publication Data

US 2006/0280412 A1      Dec. 14, 2006

Related U.S. Application Data

(60) Provisional application No. 60/688,842, filed on Jun. 9, 2005.

(51) Int. Cl.
G02B 6/44 (2006.01)
(52) U.S. Cl. ........................... 385/104; 385/101
(58) Field of Classification Search .................. 385/100, 385/102, 104
See application file for complete search history.

(56) References Cited

U.S. PATENT DOCUMENTS

| | | | |
|---|---|---|---|
| 4,143,942 A | 3/1979 | Anderson | |
| 4,285,749 A | 8/1981 | Stiles | |
| 4,305,770 A | 12/1981 | Stiles | |
| 4,367,917 A * | 1/1983 | Gray | 385/102 |
| 4,505,541 A | 3/1985 | Considine et al. | |
| 4,522,464 A * | 6/1985 | Thompson et al. | 385/107 |
| 4,577,925 A | 3/1986 | Winter et al. | |
| 4,593,969 A | 6/1986 | Goodman et al. | |
| 4,636,031 A | 1/1987 | Schmadel, Jr. et al. | |
| 4,715,677 A | 12/1987 | Saito et al. | |
| 4,786,138 A | 11/1988 | Buckley | |
| 4,790,623 A | 12/1988 | Winter et al. | |
| 4,849,753 A * | 7/1989 | Merry | 340/854.7 |
| 4,960,965 A * | 10/1990 | Redmon et al. | 174/102 R |
| 5,150,443 A * | 9/1992 | Wijnberg | 385/107 |
| 5,493,626 A * | 2/1996 | Schultz et al. | 385/101 |
| 6,004,639 A * | 12/1999 | Quigley et al. | 428/36.3 |
| 6,233,384 B1 * | 5/2001 | Sowell et al. | 385/107 |
| 6,333,384 B1 | 12/2001 | Lane et al. | |

(Continued)

FOREIGN PATENT DOCUMENTS

GB     2152235 A  *  7/1985

OTHER PUBLICATIONS

Allard, F.C., "Fiber Optics Handbook" 1990, Mc Graw Hill, New York, USA, XP002403326 p. 2.44.

*Primary Examiner* — Mark A Robinson
*Assistant Examiner* — Erin D Chiem
(74) *Attorney, Agent, or Firm* — Michael L. Flynn; David Hofman; Jody Lynn Destefenis

(57) ABSTRACT

Disclosed are wellbore electric cable components, methods of manufacturing such components, and cables incorporating the components. Particularly, ruggedized optical fibers useful for forming slickline electric cables are described. The ruggedized optical fiber components contain one or more coated optical fibers, metallic conductors, non-fiber-reinforced resins, and long-fiber-reinforced resins. The optical fiber(s) are generally positioned in the center of the component, while the metallic conductors are helically disposed around the metallic conductors. The long-fiber-reinforced resin forms an outer jacket around the combination of optical fibers and metallic conductors. A non-fiber-reinforced resin is disposed directly upon the metallic conductors, between the conductors and long-fiber-reinforced resin.

21 Claims, 3 Drawing Sheets

U.S. PATENT DOCUMENTS

| | | | |
|---|---|---|---|
| 6,411,760 B1 * | 6/2002 | Avellanet | 385/104 |
| 6,898,354 B2 | 5/2005 | Kim et al. | |
| 7,324,730 B2 | 1/2008 | Varkey et al. | |
| 2003/0098175 A1 * | 5/2003 | Goehlich | 174/110 R |
| 2004/0109650 A1 * | 6/2004 | Kim et al. | 385/100 |
| 2005/0263281 A1 | 12/2005 | Lovell | |
| 2005/0283276 A1 | 12/2005 | Prescott | |

* cited by examiner

RUGGEDIZED OPTICAL FIBERS FOR WELLBORE ELECTRICAL CABLES

RELATED APPLICATION DATA

This patent application is a non-provisional application based upon provisional application Ser. No. 60/688,842, filed Jun. 9, 2005, and claims the benefit of the filing date thereof.

BACKGROUND OF THE INVENTION

This invention relates to wellbore electric cables, as well as methods of manufacturing and using such cables. In one aspect, the invention relates to ruggedized optical fibers useful for wellbore slickline electric cables.

Generally, geologic formations within the earth that contain oil and/or petroleum gas have properties that may be linked with the ability of the formations to contain such products. For example, formations that contain oil or petroleum gas have higher electrical resistivity than those that contain water. Formations generally comprising sandstone or limestone may contain oil or petroleum gas. Formations generally comprising shale, which may also encapsulate oil-bearing formations, may have porosities much greater than that of sandstone or limestone, but, because the grain size of shale is very small, it may be very difficult to remove the oil or gas trapped therein. Accordingly, it may be desirable to measure various characteristics of the geologic formations adjacent to a well before completion to help in determining the location of an oil- and/or petroleum gas-bearing formation as well as the amount of oil and/or petroleum gas trapped within the formation.

Logging tools, which are generally long, pipe-shaped devices, may be lowered into the well to measure such characteristics at different depths along the well. These logging tools may include gamma-ray emitters/receivers, caliper devices, resistivity-measuring devices, neutron emitters/receivers, and the like, which are used to sense characteristics of the formations adjacent the well. A wireline cable, such as a slickline cable, connects the logging tool with one or more electrical power sources and data analysis equipment at the earth's surface, as well as providing structural support to the logging tools as they are lowered and raised through the well. Generally, the wireline slickline cable is spooled out of a drum unit from a truck or an offshore set up, over pulleys, and down into the well.

Wireline cables, or even permanent downhole monitoring cables, often include optical fibers for data transmittance. While optical fiber components in wireline or permanent monitoring cables have a vast potential for data transfer applications there are several weaknesses that make them vulnerable to damage in oilfield operations, including such weaknesses as: exposure to hydrogen at high temperatures results in a "darkening" of the optical fiber which reduction in data carrying capacity; limited linear stretch of the fiber as compared to the other cable components, thus requiring additional fiber length to be built in to the optical fiber components, which complicates the manufacturing process; volatilization of volatile organic compounds (VOCs) in coatings or other polymeric protective layers on the optical fibers releases additional hydrogen, which can attack and darken the fiber; hydrolytic attack of glass in the presence of water, which can lead to brittleness in the glass and susceptibility to data transmittance degradation; or lack of transverse toughness of the fiber component construction leads to potential point loading and micro-bending issues, which may lead to mechanical failure of the fiber and/or increased data attenuation.

The common approach used to create more rugged optical fiber components is to pultrude a long-fiber-reinforced epoxy thermoset resin jacket over a commercially obtained optical fiber, as illustrated in FIG. 1. As shown in FIG. 1, the optical fiber 102 has a long-fiber-reinforced epoxy thermoset resin jacket 104 pultruded thereupon to form the ruggedized optical fiber.

This approach to optical fiber ruggedizing has several disadvantages, including damage to optical fibers from point loading during the pultrusion process, shrinkage that occurs as the epoxy cures can impinge on the optical fiber and create signal attenuation problems, and handling the optical fibers more carefully to reduce the likelihood of point loading and overpull during the pultrusion process makes manufacturing difficult and time-consuming. A high incidence of signal attenuation encountered with these optical fiber components is unacceptable for use in oilfield DTS measurements, and often, the components may only be used for data transfer, and not as a conductor and data transfer device.

Thus, the need exists for wellbore electrical cables with ruggedized optical fibers, which remain durable during and after the pultrusion manufacturing process, while having conductor capability. Ruggedized optical fibers useful for forming cables which overcome one or more of the problems detailed above would be highly desirable, and the need is met at least in part by the following invention.

SUMMARY OF THE INVENTION

The invention relates to wellbore electric cable components, and methods of manufacturing and using such cable components. Particularly, the invention relates to ruggedized optical fibers useful for forming slickline electric cables. The ruggedized optical fiber components preferably include the following elements: one or more coated optical fibers; metallic conductors; non-fiber-reinforced resins; and long-fiber-reinforced resins. The optical fiber(s) are generally positioned in the center of the component, while the metallic conductors are helically disposed around the optical fiber. The metallic conductors provide the advantage of increased data and power transmittance. The long-fiber-reinforced resin forms an outer jacket around the combination of optical fibers and metallic conductors. A non-fiber-reinforced resin is disposed directly upon the metallic conductors, as well as between the conductors and long-fiber-reinforced resin.

The ruggedized optical fibers may be manufactured using such means as pultrusion and or rolltrusion. The resin used to amend the fibers could be the same material applied over the metallic conductors, thereby bonding the pultruded—or—rolltruded long fiber-reinforced resin.

The ruggedized optical fibers according to the invention may be used as components for cables useful for a variety of subterranean or subsea operations, including, but not necessarily limited to monocables, quadcables, heptacables, slickline cables, multiline cables, coaxial cables, permanent monitoring cables, or seismic cables. Cables prepared using the ruggedized optical fibers of the invention may be used with wellbore devices for monitoring purposes, or even to perform operations in wellbores penetrating geologic formations that may contain gas and oil reservoirs.

BRIEF DESCRIPTION OF THE DRAWINGS

The invention may be understood by reference to the following description taken in conjunction with the accompanying drawings, in which.

DETAILED DESCRIPTION

Figure 1:
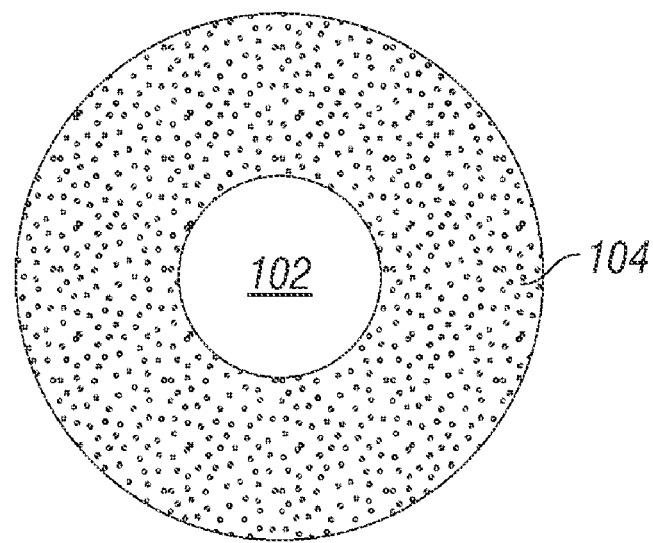
FIG. 1. illustrates by cross-sectional view a typical prior art design for ruggedized optical fibers used in wellbore electrical cables.

The description and examples are presented solely for the purpose of illustrating the preferred embodiments of the invention and should not be construed as a limitation to the scope and applicability of the invention. While the ebodiments of the present invention are described herein as comprising certain materials, it should be understood that the cables or ruggedized optical fibers could optionally comprise two or more chemically different materials. In addition, the cables or ruggedized optical fibers may also comprise some components others than those cited. In the summary of the invention and this detailed description, each numerical value should be read once as modified by the term "about" (unless already expressly so modified), and then read again as not so modified unless otherwise indicated in context.

The invention relates to wellbore electric cable components, and methods of manufacturing and using such cable components. Particularly, the invention relates to ruggedized optical fibers useful for forming slickline electric cables. The ruggedized optical fiber components include the following elements: one or more coated optical fibers; metallic conductors; non-fiber-reinforced resins; and long-fiber-reinforced resins. The optical fiber(s) are generally positioned in the center of the component, while the metallic conductors are helically disposed around the metallic conductors. The metallic conductors provide improved data as well as power transmittance. The long-fiber-reinforced resin forms an outer jacket around the combination of optical fibers and metallic conductors. A non-fiber-reinforced resin is disposed directly upon the metallic conductors, between the conductors and long-fiber-reinforced resin.

Inventors have discovered that ruggedized optical fiber components of the invention offer the following advantages over optical fiber components made with previous ruggedized optical fiber designs: easier manufacturability; helically applied metallic conductors allow better handling of the optical fibers and protect against loading during manufacture and wellbore deployment operations; and the metallic conductors also allow the ruggedized optical fiber to function as a dual use conductor for data and power transmission.

Inventors have also realized that optical fibers of the invention overcome problems related to hydrogen exposure at high temperatures which results in a "darkening" of the optical fiber that causes reduction in data carrying capacity. Also, optical fibers of the invention have improved sensitivity to volatile organic compounds (VOCs) in coatings or other polymeric protective layers, as well as resistance to hydrolytic attack of the glass in the presence of water. Further, ruggedized optical fiber designs of the invention have improved transverse toughness to overcome potential point loading and micro-bending issues during manufacture.

Any available optical fibers may be used to form the ruggedized optical fibers of the invention. The optical fibers may be single-mode fibers or multi-mode fibers, which are coated. The coating may serve to protect the fiber from shock and/or other forces experienced during handling and in operations. The coating may be, but not necessarily limited to, an acrylic coating, a silicon/PFA coating, or a polyimide coating. Any suitable metallic conductors may be used. In preferred embodiments, the metallic conductors are copper, which may be composed of solid or stranded copper wires. Optionally, the optical fiber may be enclosed in a tube, such as metallic or composite tubes, for example.

Optical fibers according to the invention may further have an interstitial filler placed over the optical fiber which may be composed of silicone, or any soft polymer with similar properties, to allow the filler to conform to the interstitial space as well as provide cushioning for the optical fibers. The cushioning affect may further improve the manufacturability and durability of the ruggedized optical fiber.

Ruggedized optical fibers include an outer jacket formed from a thin layer of non-fiber-reinforced resin adjacent the metallic conductors, followed by a layer of long-fiber-reinforced resin disposed thereupon. The jacket may provide electrically insulating properties as well as protection against galvanic corrosion. The long fibers used may be carbon, glass or any suitable natural or synthetic fiber. While any suitable resin may be used, the resin may be a thermosetting resin, such as an epoxy, or even a thermoplastic resin.

The thickness of the optical fiber coating may range up to about 20 mils, preferably from about 2 mils to about 15 mils, more preferably from about 4 mils to about 7 mils. The metallic conductors used may be of any suitable diameter, preferably from about 3 mils to about 30 mils in diameter, and more preferably from about 36 mils to 11 mils in diameter. The thickness of the outer jacket formed adjacent the metallic conductors may be from about 3 mils to about 25 mils, preferably from about 5 mils to about 15 mils. The long fibers used may have an average diameter from about 3 mils to about 60 mils, preferably from about 10 mils to about 30 mils. The overall diameter of ruggedized optical fibers of the invention may range from about 50 mils to about 500 mils, preferably from about 70 mils to about 300 mils, more preferably from about 70 mils to about 200 mils.

Figure 2:
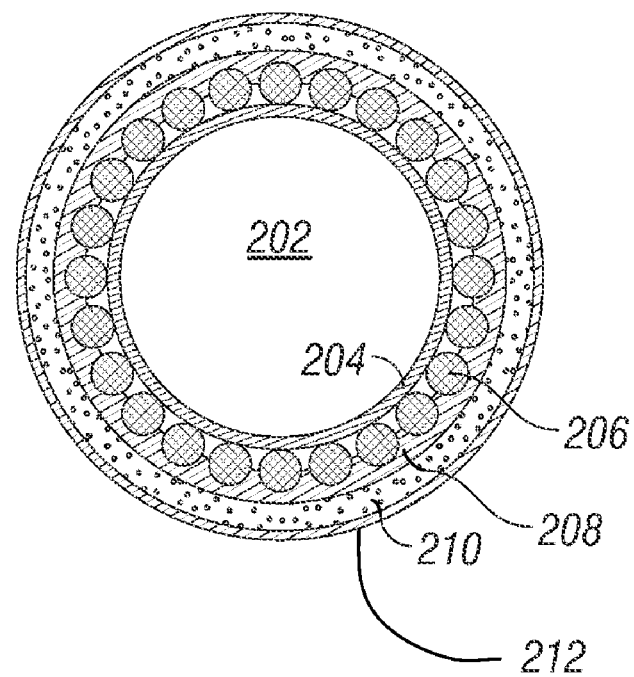
FIG. 2 represents by cross-sectional view one ruggedized optical fiber component embodiment according to the invention.

In a first embodiment of the invention, which is a ruggedized optical fiber as illustrated in FIG. 2, a PFA-coated optical fiber 202 with a layer of silicone 204 is centrally positioned upon the axis of the ruggedized optical fiber. Metallic conductors (such as copper wires) 206 (only one indicated) are cabled helically adjacent the silicone 204 at a suitable lay angle. During the manufacturing process, as the metallic conductors 206 are applied, the silicone 204 deforms to fill the spaces between the metallic conductors 206 and the PFA-coated optical fiber 202. The silicone 204 also serves as a cushion between the metallic conductors 206 and the optical fiber 202.

A thin layer of non-fiber-reinforced epoxy thermoset resin 208 is applied over the stranded copper to help prevent galvanic corrosion of metallic conductors 206 with the carbon or other fibers. Long-fiber-reinforced epoxy thermoset resin 210 is pultruded over layer 208 to ruggedize the optical fiber component. An optional layer of non-fiber-reinforced epoxy resin 212 may encase the long-fiber-reinforced epoxy resin 210 to provide surface smoothness.

Figure 3:
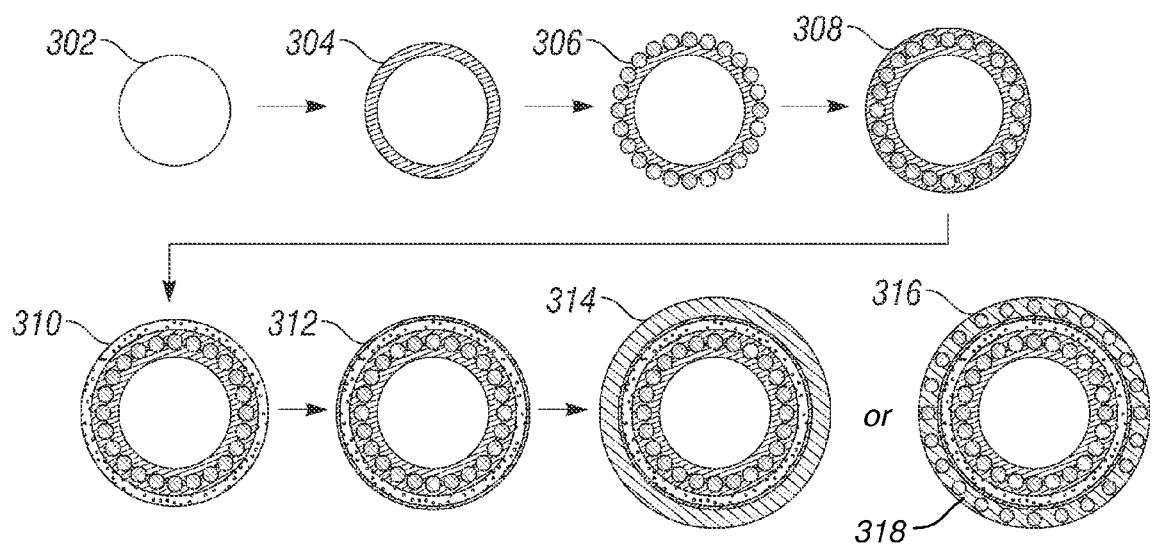
FIG. 3 illustrates in cross-sectional views of the ruggedized optical fiber, a process flow for preparing one ruggedized optical fiber embodiment according to the invention.

FIG. 3 illustrates a process flow for preparing one embodiments of ruggedized optical fiber component according to the invention, similar at least in part to the embodiment described in FIG. 2. According to FIG. 3 a single-mode or multi-mode optical fiber 302 is placed in the axial position. A soft polymer coating 304, such as silicone for example, may then be applied to create a protective cushion and act as a space-filling agent. Copper wires 306 (only one indicated) are cabled helically over the coated optical fiber at a lay angle. A layer of non-fiber reinforced epoxy thermoset resin 308 is applied to wet the copper wires and to create separation between copper and long carbon fibers. Long-fiber-reinforced epoxy thermoset resin 310 is pultruded over the non-fiber-reinforced epoxy resin 308 to ruggedize the optical fiber component. A final layer of epoxy thermoset resin 312 may be applied over the fiber-reinforced epoxy layer 310 to provide a smoother outer surface and to prevent galvanic corrosion with any outer steel members.

An optional outer metal tube 314 may be drawn over and encase, the ruggedized optical fiber component. Alternatively, small armor wires 316 (only one indicated) may be sandwiched between inner and outer jackets of carbon fiber reinforced resin 318, whereby the jackets bond between and capture the armor wires, and encase the ruggedized optical fiber component. As a further option, two layers of armor wires may be disposed to provide such properties as increased strength, protection, and torque balancing.

Figure 4:
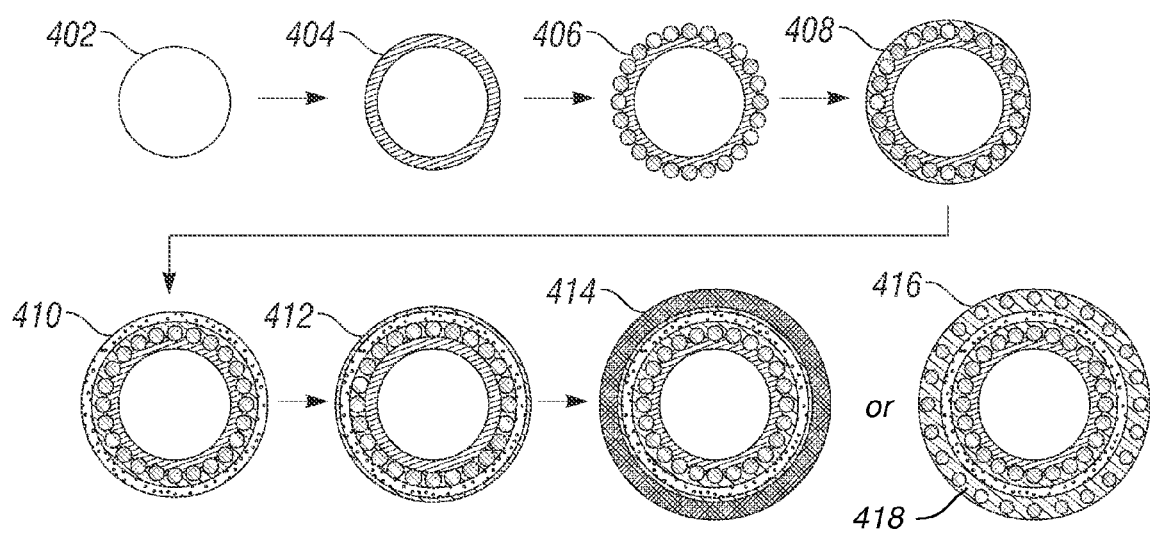
FIG. 4 shows the ruggedized optical fiber of FIG. 3 but differs that thermoplastic resins are used instead of thermoset resins.

Referring now to FIG. 4, the ruggedized optical fiber of FIG. 4 is similar to those described in FIGS. 2 and 3, but differs that thermoplastic resins are used instead of thermoset resins. The manufacturing process for ruggedized the optical fiber component is as follows. At least one single-mode or multi-mode optical fiber 402 is placed at the center. A soft polymer like silicone 404 may be applied to create a protective cushion and act as a space-filling agent. Copper wires 406 (only one indicated) are cabled helically over the coated optical fiber 404 at any suitable lay angle. A layer of non-fiber reinforced thermoplastic resin 408 is applied to wet the copper wires 406 and/or to create separation between long fibers and copper. Long-fibers in thermoplastic resin 410 are pultruded over the applied thermoplastic coating 408 to ruggedize the optical fiber component. A final layer of non-fiber reinforced thermoplastic resin 412 may be applied over the fiber-reinforced thermoplastic layer 410 to provide a smoother outer surface and to prevent galvanic corrosion with outer steel members.

An optional outer metal tube 414 may be drawn over the top of, and encase, the ruggedized optical fiber component. Alternatively, small armor wires 416 (only one indicated) may be sandwiched between inner and outer jackets of carbon fiber reinforced resin 418, whereby the jackets bond between and capture the armor wires, and encase the ruggedized optical fiber component. As a further option, two layers of armor wires may be disposed to provide such properties as increased strength, protection, and torque balancing.

Figure 5:
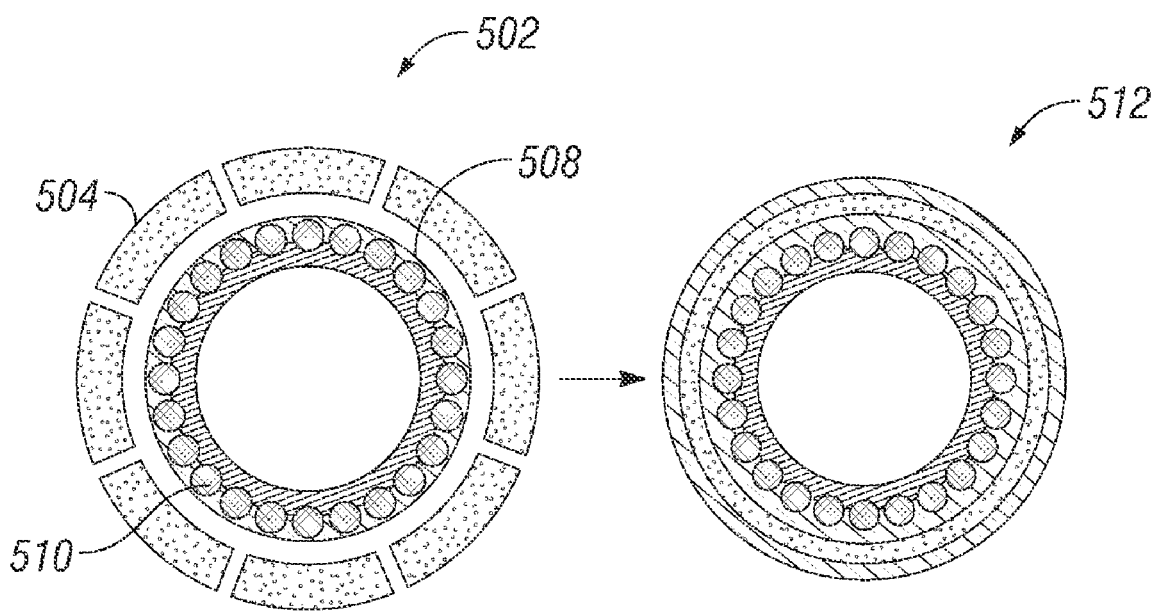
FIG. 5 illustrates in cross-sectional views of the ruggedized optical fiber process steps of applying long fiber-reinforced resins over the optical fiber components to form one embodiment of the invention.

In another process of applying long fiber-reinforced resins over the optical fiber components, the steps illustrated in FIG. 5, keystone-shaped strands of long fiber-reinforced thermoplastic resin 502 (only one indicated) are applied over an optical fiber component 504, through a process of pultrusion, rolltrusion, or combination thereof. These keystone-profile strands 502 are then formed over the optical fiber component 504 by melting thermoplastic resin coating 508 on top of the metallic conductors 510 and the surfaces of the keystone-shaped strands of long fiber-reinforced thermoplastic resins 502. This approach provides the ruggedized optical fiber 512.

Various methods may be used to apply long fiber-reinforced resins over the optical fiber components. The long fiber-reinforced resins may be applied by such processes as pultrusion, rolltrusion, or a combination thereof, or any means known or readily apparent to those of skill in the art. Pultrusion is continuous process for manufacturing composites with a constant cross-sectional shape. The process consists of pulling a fiber reinforcing material through a resin impregnation bath and into a shaping die where the resin is subsequently cured. Heating to both gel and cure the resin is sometimes accomplished entirely within the die length. In other variations of the process, preheating of the resin-wet reinforcement is accomplished by dielectric energy prior to entry into the die, or heating may be continued in an oven after emergence from the die. The pultrusion process yields long continuous lengths of material with high unidirectional strengths. The resin used to amend the fibers could be the same material applied over the metallic conductors.

Contrasted with pultrusion, rolltrusion techniques are used to shape wet resin coated long fibers between two rollers that have profiles grooved on the outer surface for guiding the fibers. The upper roller exerts adequate pressure to remove by squeezing at least a substantial volume of air from the wet resin coating the long fibers, as well as to form the desired composite structure.

The ruggedized optical fibers according to the invention may be components of cables useful for a variety of subterranean or subsea operations. To form the cables, the ruggedized optical fiber may be cabled with other cable components, such as conductors, fillers, armor wires, tapes, jackets, and the like to form a cable. Methods of forming cables will be readily known or apparent to those of skill in the art. Such cables include monocables, quadcables, heptacables, slickline cables, multiline cables, coaxial cables, permanent monitoring cables, or even seismic cables.

Figure 6:
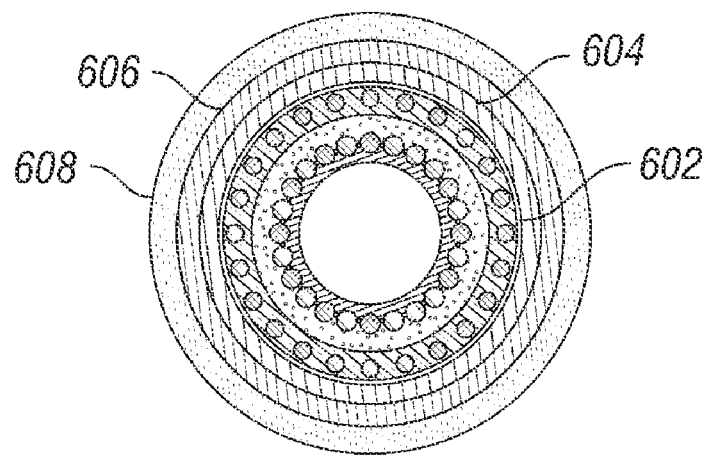
FIG. 6 shows by cross-sectional views one embodiment of a slickline cable containing a ruggedized optical fiber of the invention.

The ruggedized optical fibers of the invention are particularly useful for conductive slickline cables useful for conducting electrical power and data. Referring now to FIG. 6, inn one embodiment, the slickline cable comprises the ruggedized optical fiber 602 (such as those described in FIG. 3 or FIG. 4), and an outer metallic tube 608 encasing the ruggedized optical fiber 602. Also, an inner tube 604, such as, but no necessarily limited to, a metallic tube, may encase the ruggedized optical fiber 602, and an electrically insulating layer 606 may disposed adjacent the inner tube 604, or even disposed directly adjacent the ruggedized optical fiber 602.

Cables prepared using the ruggedized optical fibers of the invention may be used with wellbore devices to perform operations in wellbores penetrating geologic formations that may contain gas and oil reservoirs. The cables may be used to interconnect well logging tools, such as gamma-ray emitters/receivers, caliper devices, resistivity-measuring devices, seismic devices, neutron emitters/receivers, and the like, to one or more power supplies and data logging equipment outside the well. Cables may also be used in seismic operations, including subsea and subterranean seismic operations. The cables may also be useful as permanent monitoring cables for wellbores.

The particular embodiments disclosed above are illustrative only, as the invention may be modified and practiced in different but equivalent manners apparent to those skilled in the art having the benefit of the teachings herein. Further-more, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A ruggedized optical fiber comprising:
   a) at least one coated optical fiber fiber, wherein the coating thickness of the at least one coated optical fiber is from about 2 mils to about 15 mils;
   b) a plurality of metallic conductors helically disposed adjacent the coated optical fiber;
   c) a non-fiber-reinforced resin disposed directly upon the metallic conductors; and
   d) a long-fiber-reinforced resin encasing the combination of optical fibers, metallic conductors, and non-fiber-reinforced resin and forming an exterior surface of the ruggedized optical fiber, wherein the diameter of the metallic conductors is from about 3 mils to about 30 mils, and the thickness of the non-fiber-reinforced resin disposed directly upon the metallic conductors is from about 3 mils to about 25 mils.

2. The ruggedized optical fiber of claim 1 further comprising a layer of non-fiber-reinforced resin encasing the long-fiber-reinforced resin to form the exterior surface of the ruggedized optical fiber.

3. The ruggedized optical fiber of claim 1 wherein the non-fiber-reinforced resin and long-fiber-reinforced resin are both based upon epoxy thermoset resin.

4. The ruggedized optical fiber of claim 1 wherein the non-fiber-reinforced resin and long-fiber-reinforced resin are both based upon a thermoplastic resin.

5. The ruggedized optical fiber of claim 1 further comprising a silicone based filler material disposed adjacent the coated optical fiber.

6. The ruggedized optical fiber of claim 1 wherein the coated optical fiber is a single mode coated optical fiber.

7. The ruggedized optical fiber of claim 1 wherein the coated optical fiber is a multi mode coated optical fiber.

8. The ruggedized optical fiber of claim 1 wherein the metallic conductors are copper conductors.

9. The ruggedized optical fiber of claim 1 wherein long-fiber-reinforced resin comprises keystone shaped strands of long-fiber-reinforced thermoplastic resin.

10. The ruggedized optical fiber of claim 1 further comprising a metal tube encasing the ruggedized optical fiber to form the exterior surface of the ruggedized optical fiber.

11. The ruggedized optical fiber of claim 1 further comprising one or more layers of armor wires sandwiched between inner and outer jackets of carbon fiber reinforced resin, which encase the ruggedized optical fiber.

12. The ruggedized optical fiber of claim 1 as used to form a wellbore electrical cable.

13. The ruggedized optical fiber of claim 1 wherein the coating thickness of the coated optical fiber is from about 4 mils to about 7 mils, the diameter of the metallic conductors is from about 36 mils to 11 mils, and the thickness of the non-fiber-reinforced resin disposed directly upon the metallic conductors is from about 5 mils to about 15 mils.

14. A wellbore electrical slickline cable comprising:
   a) a ruggedized optical fiber comprising:
      (i) at least one coated optical fiber having a cushioning layer disposed thereon, wherein the coating thickness of the coated optical fiber is from about 4 mils to about 7 mils,
      (ii) a plurality of metallic conductors helically disposed adjacent the coated optical fiber the cushioning layer filling spaces between the conductors and the coated optical fiber,
      (iii) a non-fiber-reinforced resin disposed directly upon the metallic conductors, and
      (iv) a long-fiber-reinforced resin encasing the combination of optical fibers, metallic conductors, and non-fiber-reinforced resin; and,
   b) a unitary outer metallic tube encasing the ruggedized optical fiber and forming an exterior surface of the wellbore electrical slickline cable, wherein the diameter of the metallic conductors is from about 36 mils to 11 mils, the thickness of the non-fiber-reinforced resin disposed directly upon the metallic conductors is from about 5 mils to about 15 mils, and the ruggedized optical fiber may range in diameter from about 70 mils to about 300 mils.

15. The cable of claim 14 further comprising an electrically insulating layer adjacent the ruggedized optical fiber.

16. The cable of claim 14 further comprising an inner tube encasing the ruggedized optical fiber and an electrically insulating layer disposed adjacent the inner tube.

17. The cable of claim 14 as used with devices to perform operations in a wellbore penetrating a geological formation.

18. A wellbore permanent monitoring cable comprising:
   a) a ruggedized optical fiber comprising:
      (i) at least one coated optical fiber, wherein the coating thickness of the at least one coated optical fiber is from about 2 mils to about 15 mils,
      (ii) a plurality of metallic conductors helically disposed adjacent the coated optical fiber,
      (iii) a non-fiber-reinforced resin disposed directly upon and encasing the metallic conductors, and
      (iv) a long-fiber-reinforced resin encasing the combination of optical fibers, metallic conductors, and non-fiber-reinforced resin;
   b) an inner metallic tube encasing the ruggedized optical fiber;
   c) an electrically insulating layer ; and
   d) a unitary outer metallic tube encasing the electrically insulating layer, the inner metallic tube, and the ruggedized optical fiber and forming an exterior surface of the wellbore permanent monitoring cable, wherein the diameter of the metallic conductors is from about 3 mils to about 30 mils, and the thickness of the non-fiber-reinforced resin disposed directly upon the metallic conductors is from about 3 mils to about 25 mils.

19. The wellbore permanent monitoring cable according to claim 18 wherein the nonfiber reinforced resin encases and separates each of the individual metallic conductors.

20. The ruggedized optical fiber according to claim 1 wherein the plurality of metallic conductors are disposed directly adjacent the coated optical fiber.

21. The wellbore electrical slickline cable according to claim 14 wherein the cushioning layer fills spaces between each of the conductors.

* * * * *